(12) United States Patent
Xie et al.

(10) Patent No.: US 11,880,120 B2
(45) Date of Patent: Jan. 23, 2024

(54) GIMBAL CONTROL METHOD AND DEVICE

(71) Applicant: SZ DJI TECHNOLOGY CO., LTD., Shenzhen (CN)

(72) Inventors: Wenlin Xie, Shenzhen (CN); Zihan Chen, Shenzhen (CN); Yanchong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 570 days.

(21) Appl. No.: 17/096,265

(22) Filed: Nov. 12, 2020

(65) Prior Publication Data
US 2021/0064069 A1    Mar. 4, 2021

Related U.S. Application Data

(63) Continuation of application No. PCT/CN2018/088254, filed on May 24, 2018.

(51) Int. Cl.
*G03B 17/56* (2021.01)
*G05D 17/02* (2006.01)
*H02P 6/08* (2016.01)

(52) U.S. Cl.
CPC ........... *G03B 17/561* (2013.01); *G05D 17/02* (2013.01); *H02P 6/08* (2013.01); *H02P 2205/07* (2013.01)

(58) Field of Classification Search
CPC .... G03B 17/56; G03B 17/561; G03B 17/563; F16M 13/00; F16M 13/02; F16M 13/022; F16M 13/04; G05D 17/00; G05D 17/02; H02P 6/08; H02P 2205/07
See application file for complete search history.

(56) References Cited

U.S. PATENT DOCUMENTS

| | | | |
|---|---|---|---|
| 4,774,589 | A | 9/1988 | Rowland |
| 2011/0280565 | A1 | 11/2011 | Chapman et al. |

FOREIGN PATENT DOCUMENTS

| | | |
|---|---|---|
| CN | 1938934 A | 3/2007 |
| CN | 102591366 A | 7/2012 |
| CN | 105227824 A | 1/2016 |
| CN | 105676880 A | 6/2016 |
| CN | 205908977 U | 1/2017 |

(Continued)

OTHER PUBLICATIONS

The World Intellectual Property Organization (WIPO) International Search Report for PCT/CN2018/088254 dated Jan. 30, 2019 4 Pages (including translation).

*Primary Examiner* — Clayton E. LaBalle
*Assistant Examiner* — Fang-Chi Chang
(74) *Attorney, Agent, or Firm* — ANOVA LAW GROUP, PLLC

(57) ABSTRACT

A gimbal control method includes configuring, while a gimbal is in a power-on state, turning-off motor control parameters according to a mass of a camera device carried by the gimbal. The gimbal includes an electric motor. The turning-off motor control parameters are configured to control the electric motor when the gimbal is powered off or enters a sleep state. The method further includes, in response to the gimbal being powered off or entering the sleep state, controlling a torque of the electric motor to decrease gradually from a starting moment at which the gimbal is powered off or enters the sleep state according to the turning-off motor control parameters.

20 Claims, 5 Drawing Sheets

(56) References Cited

FOREIGN PATENT DOCUMENTS

| | | |
|---|---|---|
| CN | 107002941 A | 8/2017 |
| CN | 107094368 A | 8/2017 |
| CN | 107223220 A | 9/2017 |
| CN | 107406146 A | 11/2017 |
| CN | 107817823 A | 3/2018 |
| CN | 108055466 A | 5/2018 |
| KR | 20090065853 A | 6/2009 |
| WO | WO-2016190994 A1 * 12/2016 ........... B64C 39/024 |
| WO | 2018000122 A1 | 1/2018 |

* cited by examiner

GIMBAL CONTROL METHOD AND DEVICE

CROSS-REFERENCE TO RELATED APPLICATION

This application is a continuation of International Application No. PCT/CN2018/088254, filed May 24, 2018, the entire content of which is incorporated herein by reference.

TECHNICAL FIELD

The present disclosure generally relates to the gimbal control field and, more particularly, to a gimbal control method and device.

BACKGROUND

Most of existing gimbals have a sleep function, i.e., a gimbal is powered on but a motor of the gimbal does not provide force, to save power of the gimbal to increase use time. When the gimbal is controlled to power off or sleep, the motor is powered off instantly. During use of a gimbal, a user may perform focus adjustment on a camera device carried by the gimbal or use a follow focus device to perform the focus adjustment on the camera device, which may cause the center of gravity of the camera device to change. If the camera device is not balanced, instantly powering off the motor will cause the camera device to quickly and directly collide with an axis wall or ground. Moreover, impact on the camera device is relatively large, which may cause damage to the camera device in severe cases and affect user experience.

SUMMARY

Embodiments of the present disclosure provide a gimbal control method. The method includes configuring, while a gimbal is in a power-on state, turning-off motor control parameters according to a mass of a camera device carried by the gimbal. The gimbal includes an electric motor. The turning-off motor control parameters are configured to control the electric motor when the gimbal is powered off or enters a sleep state. The method further includes, in response to the gimbal being powered off or entering the sleep state, controlling a torque of the electric motor to decrease gradually from a starting moment at which the gimbal is powered off or enters the sleep state according to the turning-off motor control parameters.

Embodiments of the present disclosure provide a gimbal control method. The method includes configuring, while a gimbal is in a power-on state, turning-off motor control parameters. The gimbal includes an axis arm and an electric motor configured to drive the axis arm to rotate to drive a camera device carried by the gimbal to move in one or more directions. The turning-off motor control parameters are configured to control the electric motor when the gimbal is powered off or enters a sleep state. Configuring the turning-off motor control parameters includes obtaining a torque of the axis arm according to a current value of the electric motor, measuring an angular acceleration of the axis arm through an inertial measurement unit (IMU) arranged at the axis arm, calculating a ratio of the torque of the axis arm to the angular acceleration to obtain a moment of inertia of the camera device, and configuring the turning-off motor control parameters according to the moment of inertia of the camera device. The method further includes, in response to the gimbal being powered off or entering the sleep state, controlling a torque of the electric motor to decrease gradually from a starting moment at which the gimbal is powered off or enters the sleep state according to the turning-off motor control parameters.

Embodiments of the present disclosure further provide a gimbal control device including an axis arm, an electric motor, and one or more controllers. The electric motor is connected to the axis arm and configured to drive the axis arm to drive a camera device carried by the gimbal to move in one or more directions. The one or more controllers are communicatively connected to the electric motor. The one or more controllers are configured to operate individually or collectively to configure, while the gimbal is in a power-on state, turning-off motor control parameters according to a mass of the camera device. The turning-off motor control parameters are configured to control the electric motor when the gimbal is powered off or enters a sleep state. The one or more controllers are further configured to operate individually or collectively to, in response to the gimbal being powered off or entering the sleep state, control a torque of the electric motor to decrease gradually from a starting moment at which the gimbal is powered off or enters the sleep state according to the turning-off motor control parameters.

DETAILED DESCRIPTION OF THE EMBODIMENTS

The technical solution of embodiments of the present disclosure is described in detail in connection with the accompanying drawings of embodiments of the present disclosure. Described embodiments are merely some embodiments of the present disclosure, not all embodiments. Based on embodiments of the present disclosure, other embodiments obtained by those skilled in the art without creative efforts are within the scope of the present disclosure.

A gimbal control method and device of the present disclosure are described in detail in connection with the accompanying drawings. Without conflict, features of embodiments of the present disclosure may be combined.

Figure 1:
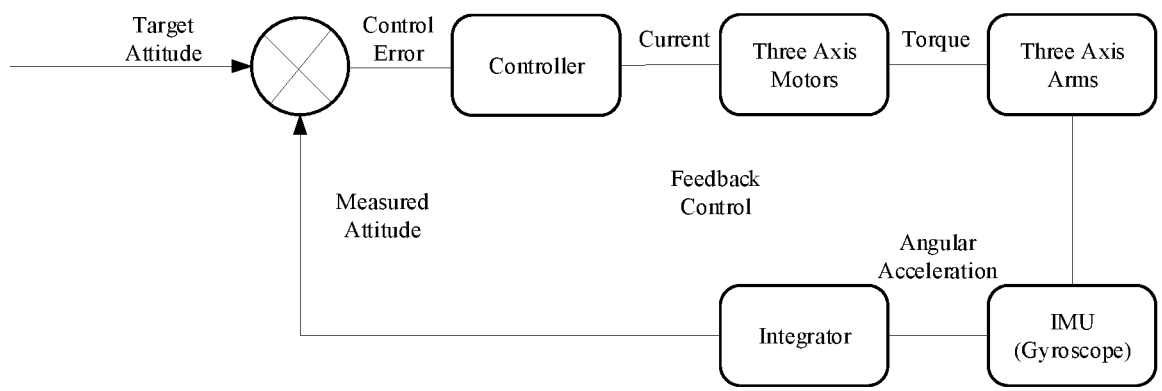
FIG. 1 is a schematic diagram showing a working principle of a three-axis gimbal according to some embodiments of the present disclosure.
Figure 7:
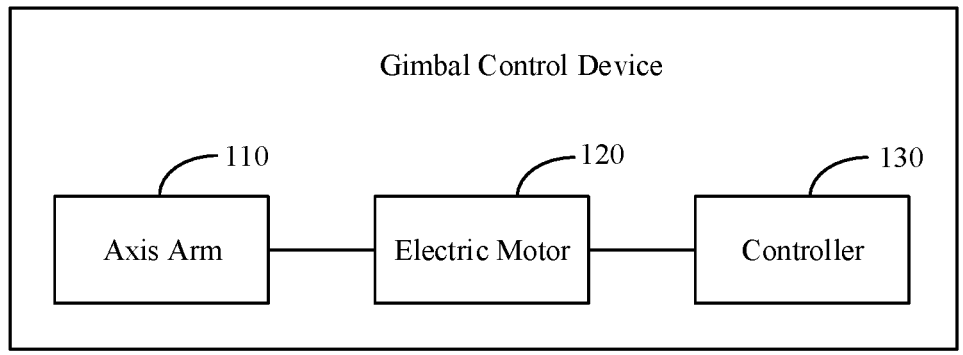
FIG. 7 is a schematic structural block diagram of a gimbal control device according to some embodiments of the present disclosure.
Figure 8:
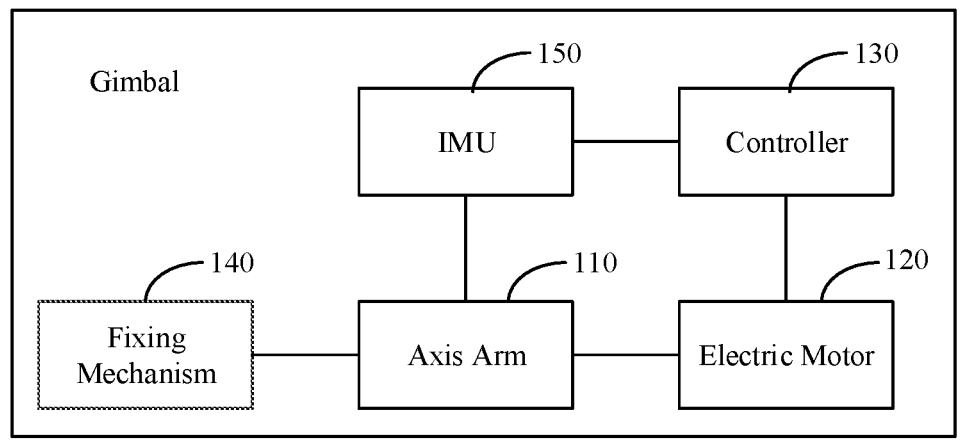
FIG. 8 is a schematic structural block diagram of a gimbal according to some embodiments of the present disclosure.

A gimbal consistent with embodiments of the present disclosure may be a handheld gimbal or a gimbal carried by a mobile device (e.g., an unmanned aerial vehicle (UAV), an unmanned vehicle, etc.). As shown in FIG. 1, FIG. 7, and FIG. 8, the gimbal includes an axis arm 110 and an electric motor 120. The electric motor 120 may be configured to drive the axis arm 110 to rotate. For example, a three-axis gimbal includes three axis arms 110 and three electric motors 120 configured to drive the three axis arms 110 to rotate, respectively. The three axis arms 110 include a pitch axis arm, a roll axis arm, and a yaw axis arm. When the gimbal carries a load device, for example, a recorder or a camera, the load device may move in one or more directions to photograph in a large range.

FIG. 1 is a schematic diagram showing a working principle of a three-axis gimbal. As shown in FIG. 1, FIG. 7, and FIG. 8, the three-axis gimbal includes a controller 130, three axis electric motors, three axis arms, an inertial measurement unit (IMU) 150, and an integrator. For the three-axis gimbal, a closed-loop PI (proportion, integration) control system can be formed by using a gyroscope of the IMU 150 as a feedback element and the three axis electric motors as output elements.

A measured attitude of the gimbal may be obtained by the IMU 150. A difference between the measured attitude and a target attitude may be used as a control error. The controller 130 may control input currents of the three axis electric motors according to the control error to drive the three axis electric motors to operate. The three axis electric motors may output torques to drive the three axis arms to rotate during the operation. During rotation, the measured attitude of the gimbal may further change to cause the gimbal to move to the target attitude through the above feedback control process.

Different types of camera devices may be paired with the gimbal. These camera devices may have different masses, for example, between 0.5 kg and 3.6 kg. Compared to the gimbal of a handheld camera device, the mass range of the camera device is relatively large. In application, a user may perform focus adjustment on the camera device carried by the gimbal or use a focus following device to perform the focus adjustment on the camera device as needed, which may cause the center of gravity of the camera device to change. When the gimbal is powered off or sleeps, the electric motor 120 may be powered off instantly. If the camera device is not balanced, the instant powering off of the electric motor 120 may cause the camera device to quickly and directly collide with an axis wall or ground. Moreover, the camera device may be damaged in severe cases to affect user experience. Therefore, the gimbal consistent with embodiments of the present disclosure may automatically configure control parameters when the electric motor 120 is powered off or sleeps according to the mass of the camera device carried by the gimbal. Thus, the gimbal may not be powered off instantly when the gimbal is powered off or sleeps. As such, when the gimbal is not adjusted to a balanced state, the camera device will not be damaged or bumped when the electric motor 120 releases force, which can protect the camera device and improve the user experience.

Figure 2:
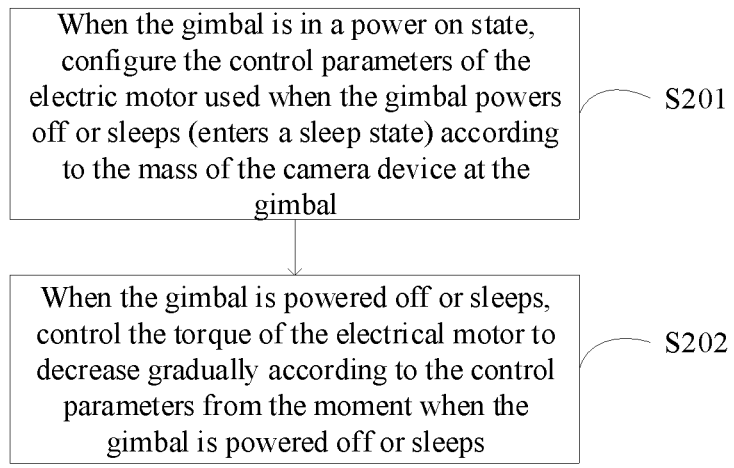
FIG. 2 is a schematic flowchart of a gimbal control method according to some embodiments of the present disclosure.

FIG. 2 is a schematic flowchart of a gimbal control method according to some embodiments of the present disclosure. The method may include the following processes.

At S201, when the gimbal is in a power on state, the control parameters of the electric motor 120 used when the gimbal powers off or sleeps (enters a sleep state) are configured according to the mass of the camera device at the gimbal. A control parameter of the electric motor 120 used when the gimbal powers off or sleeps is also referred to as a "turning-off control parameter" of the electric motor 120 or a "turning-off motor control parameter."

For example, the gimbal is a three-axis gimbal including three electric motors 120, and the electric motors 120 of the three-axis gimbal may include a pitch axis electric motor, a roll axis electric motor, and a yaw axis electric motor. The control parameters at S201 may include control parameters corresponding to the three electric motors, that is, control parameters of the pitch axis electric motor, control parameters of the roll axis electric motor, and control parameters of the yaw axis electric motor.

Figure 3:
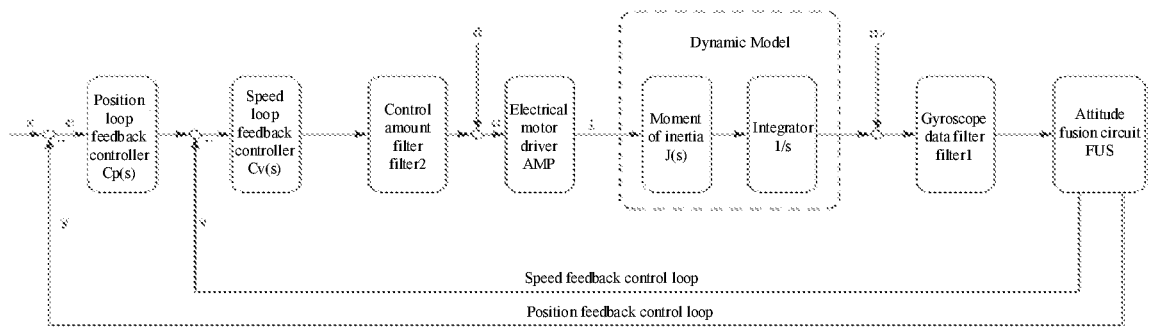
FIG. 3 is a schematic diagram showing a control principle of a gimbal control system according to some embodiments of the present disclosure.

FIG. 3 is a schematic diagram showing a control principle of a gimbal control system according to some embodiments of the present disclosure. FIG. 3 shows a feedback control principle of the gimbal control system. The system from left to right includes a position loop feedback controller Cp(s), a speed loop feedback controller Cv(s), a control amount filter 2, a driver AMP of the electric motor 120, a kinetic model composed of a moment of inertia J(s) and an integrator 1/s, a gyroscope data filter 1, and an attitude fusion circuit FUS. The system may realize double-loop control according to a signal flow direction and different feedback control objects, that is, the control includes a speed feedback control loop, which is configured to control the gimbal attitude, and a position feedback control loop, which is configured to control a displacement of the gimbal. In FIG. 3, r denotes a reference input signal, e denotes a tracking error signal, a denotes an acceleration signal, v denotes a speed signal, y denotes a displacement signal, d denotes an equivalent disturbance signal, u denotes a control voltage, i denotes a current signal, and $n_v$ denotes a measurement noise.

The control parameters may include a sensitivity value parameter of the position feedback control loop of the electric motor 120 and a force value parameter of the speed feedback control loop of the electric motor 120. The process S201 includes, according to the mass of the camera device, configuring the sensitivity value parameter of the position feedback control loop and the force value parameter of the speed feedback control loop of the electric motor 120.

After the camera device is mounted to the gimbal, the gimbal may enter a power on mode. While in the power on state, the gimbal may automatically and adaptively configure the control parameters according to the camera device. A plurality of control parameter configuration manners may exist. In some embodiments, according to the mass of the camera device, the moment of inertia of the camera device may be calculated first. Then, according to the moment of inertia, the control parameters of the electric motor 120 used when the gimbal is powered off or sleeps may be configured.

A calculation manner of the moment of inertia of the camera device is not limited to the above-described manner and may be the following manner. A torque value of the axis arm 110 may be obtained according to the current value of the electric motor 120. Then, an angular acceleration value of the axis arm 110 may be measured by the IMU 150 arranged at the axis arm 110. Subsequently, the moment of inertia of the camera device may be obtained by calculating a ratio of the torque value to the angular acceleration value of the axis arm 110.

The moment of inertia is a measure of inertia when a rigid body rotates around an axis, that is, a rotation form equivalence of mass. The moment of inertia may be calculated through the following formula:

$$J=F/\beta$$

where J denotes the moment of inertia, F denotes a force, and β denotes the angular acceleration.

In some embodiments, the torque of the axis arm 110 may be obtained according to the current value of the electric motor 120 corresponding to the axis arm 110. The torque of the electric motor 120 may refer to a torque output by the electric motor 120 from its crankshaft end. The torque is a force that causes the axis arm 110 corresponding to the electric motor 120 to rotate. The current of the electric motor 120 is proportional to the torque, which is represented by the following formula:

$$M=Ca \times i$$

where M denotes the torque, Ca denotes a constant, and i denotes the current.

In some embodiments, the angular acceleration value of the axis arm 110 may be measured by the IMU 150 arranged at the axis arm 110. Then, the moment of inertia may be obtained by calculating a ratio of the torque and the angular acceleration value according to the formula.

In some other embodiments, according to the mass of the camera device and a predetermined parameter configuration model, the control parameters of the electric motor 120 used when the gimbal is powered off or sleeps may be configured. In some embodiments, the parameter configuration model may be an empirical model formula, which is pre-stored in the gimbal. After the gimbal is powered on, the mass of the camera device currently carried by the gimbal may be recognized and input to the parameter configuration model to obtain the control parameters of the electric motor 120 used when the gimbal is powered off or sleeps. The calculation process of the control parameter is convenient and quick.

During application, the user may adjust the focal length of the camera device to cause the camera device to satisfy photographing requirements. After the focal length of the camera device is changed, the moment of inertia of the camera device may also change. In some embodiments, the gimbal may self-adaptively adjust the control parameters according to a real-time focal length of the camera device to ensure that the electric motor 120 may not be powered off instantly when the gimbal is powered off or sleeps. As such, when the gimbal is not adjusted to the balanced state, the camera device may not be damaged or bumped when the electric motor 120 releases the force to protect the camera device and improve the user experience. In some embodiments, at process S201, the gimbal control method further includes, according to the real-time focal length of the camera device, self-adaptively adjusting the control parameters of the electric motor 120 used when the gimbal is powered off or sleeps. In some embodiments, the gimbal may self-adaptively adjust the control parameters according to the real-time focal length of the camera device.

In some embodiments, after process S201, the gimbal control method further includes storing the control parameters of the electric motor 120 used when the gimbal is powered off or sleeps. In some embodiments, the control parameters may be stored after the control parameters are configured, which may facilitate the gimbal to directly call the control parameters to control the operation of the electric motor 120 when the gimbal is powered off or sleeps. As such, colliding of the camera device with the axis arm 110 or ground due to the instant powering off of the electric motor 120 can be prevented. The control parameter storage manner may include any type of data storage manner, for example, the control parameters may be stored as a file or in a database.

In some embodiments, the process of self-adaptively configuring the control parameters may be performed right after the gimbal is powered on.

In some other embodiments, the process of self-adaptively configuring the control parameters may be triggered by the user. In some embodiments, before process S201, the gimbal control method may further include receiving a parameter adjustment instruction.

In some embodiments, when the gimbal is in the power-on state, the parameter adjustment instruction may be received through different manners to enter the subsequent self-adaptive parameter adjustment and configuration process. In some embodiments, the parameter adjustment instruction may be received through any one of the following manners.

In some embodiments, when the gimbal is in the power-on state, the parameter adjustment instruction may be obtained by triggering a parameter adjustment button of the gimbal. In some embodiments, the parameter adjustment button may be arranged at the gimbal. When the user pushes the parameter adjustment button, the gimbal may receive the parameter adjustment instruction.

In some embodiments, when the gimbal is in the power-on state, the gimbal may receive the parameter adjustment instruction transmitted by a remote controller corresponding to the gimbal. In some embodiments, after the user of the gimbal operates the remote controller to send the parameter adjustment instruction, the gimbal may receive the corresponding parameter adjustment instruction.

At S202, when the gimbal is powered off or sleeps, the torque of the electric motor 120 is controlled to decrease gradually according to the control parameters from the moment when the gimbal is powered off or sleeps. In this disclosure, the moment when the gimbal is powered off or sleeps is also referred to as a "starting moment."

In the existing technology, when the gimbal is powered off or sleeps, the torque of the electric motor 120 may decrease to zero instantly. Then, the camera device may fall due to gravity. Since an impact to the camera device is relatively large, the camera device may be easily damaged by colliding with the axis arm 110 or ground. In some embodiments, when the gimbal is powered off or sleeps, according to the control parameters, the torque of the electric motor 120 may be controlled to decrease gradually (i.e., decrease monotonically) in a period of time from the moment when the gimbal is powered off or sleeps. As such, time of powering off the electric motor 120 may be extended to reduce the impact to the camera device during falling. In this case, even if the camera device collides with the axis arm 110 or ground, the camera device will not be damaged because of the small impact.

In some embodiments, when the gimbal is powered off or sleeps, according to the control parameters, the torque of the electric motor 120 may be controlled to decrease gradually to zero from the moment when the gimbal is powered off or sleeps. As such, when the gimbal is powered off or sleeps, the torque of the electric motor 120 may be reduced to zero in a period but not instantly, so as to prevent the camera device from damaging due to the large impact when the camera device collides the axis arm 110 or ground.

Figure 4:
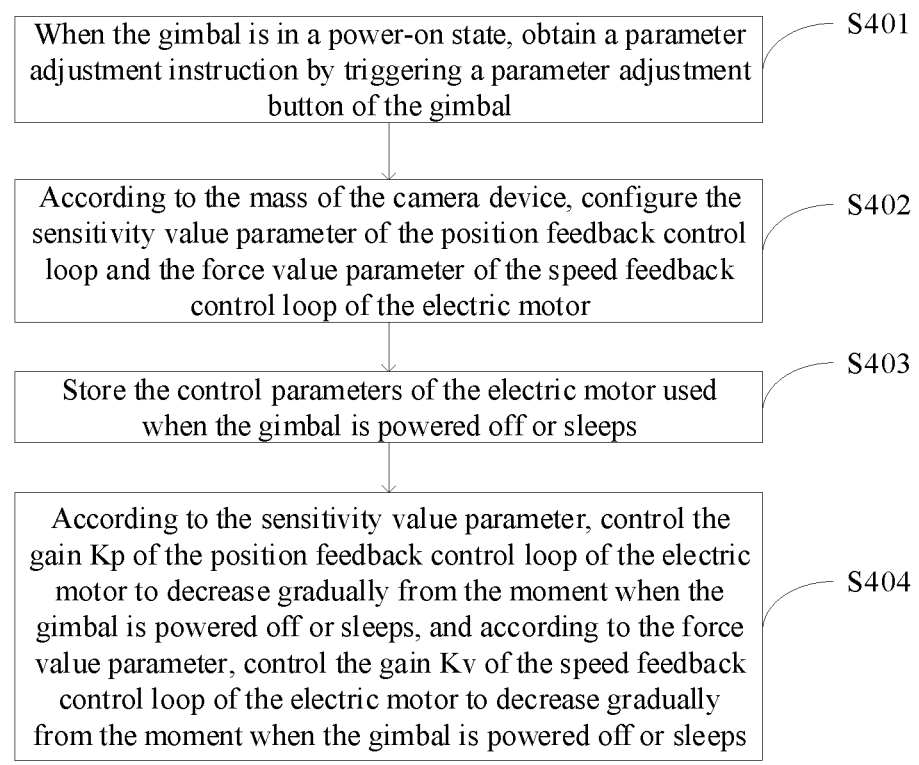
FIG. 4 is a schematic flowchart of a gimbal control method according to some other embodiments of the present disclosure.

FIG. 4 is a schematic flowchart of another gimbal control method according to some other embodiments of the present disclosure.

At S401, when the gimbal is in a power-on state, a parameter adjustment instruction is obtained by triggering a parameter adjustment button of the gimbal.

After the camera device is mounted to the gimbal, the gimbal may enter a power-on mode. For example, the three-axis handheld gimbal may enter the power on mode under two states according to different photographing requirements. In one state, a fixing mechanism (also called a base of the gimbal) may face upward. After being powered on, the gimbal may be fixed at a carrier such as a rocking arm to photograph. In another state, the fixing mechanism of the gimbal may face downward, and the roll axis of the gimbal may be rotated 180°. After the gimbal is powered on, the gimbal may be mounted at a retractable rod for photographing.

In some embodiments, the parameter adjustment button may be arranged at the gimbal. When the gimbal carries a new camera device and is powered on, the user of the gimbal may push the parameter adjustment button to send the parameter adjustment instruction. As such, after receiving the parameter adjustment instruction, the control system may enter the subsequent self-adaptive control parameter configuration process. In some other embodiments, a parameter adjustment button may be added to an APP of the remote controller of the gimbal.

At S402, according to the mass of the camera device, the sensitivity value parameter of the position feedback control loop and the force value parameter of the speed feedback control loop of the electric motor 120 are configured.

As shown in FIG. 3, after the moment of inertia is obtained, the force value parameter of the speed feedback control loop is configured by using the moment of inertia, such as a gain Kv of Cv(s). The sensitivity value parameter of the position feedback control loop is configured by using the moment of inertia, such as a gain Kp of Cp(s).

Referring again to FIG. 4, at S403, the control parameters of the electric motor 120 used when the gimbal is powered off or sleeps are stored.

In some embodiments, the control parameters may be self-adaptively configured after the gimbal is powered on or the parameter adjustment button is triggered. After being configured, the control parameters may be stored. As such, the gimbal may directly call the control parameters to control the electric motor 120 to operate when the gimbal is powered off or sleeps to prevent the camera device from colliding with the axis arm 110 or ground quickly due to the instant power off of the electric motor 120. In some embodiments, the control parameters may be stored as a file or in a database.

At S404, according to the sensitivity value parameter, the gain Kp of the position feedback control loop of the electric motor 120 is controlled to decrease gradually from the moment when the gimbal is powered off or sleeps and, according to the force value parameter, the gain Kv of the speed feedback control loop of the electric motor 120 is controlled to decrease gradually from the moment when the gimbal is powered off or sleeps.

Figure 5A:
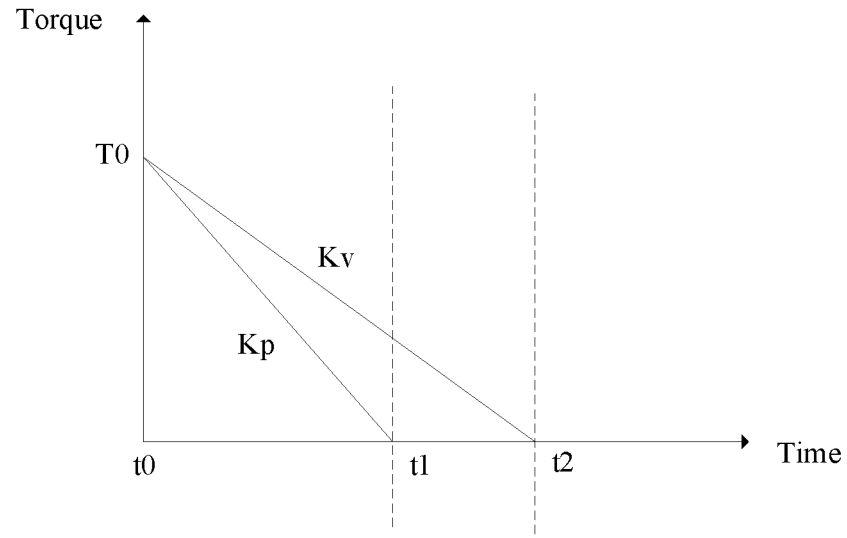
FIG. 5A is a schematic diagram showing a control curve of a motor torque according to some embodiments of the present disclosure.
Figure 5B:
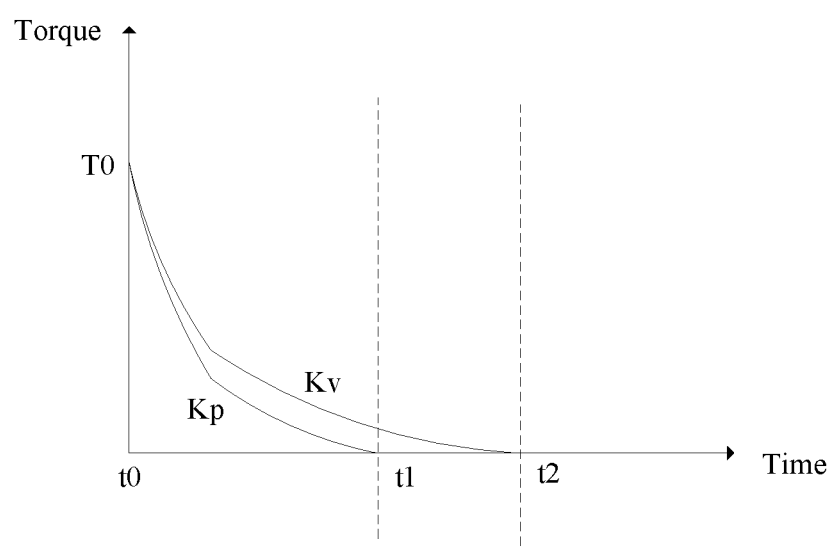
FIG. 5B is a schematic diagram showing another control curve of the motor torque according to some embodiments of the present disclosure.
Figure 5C:
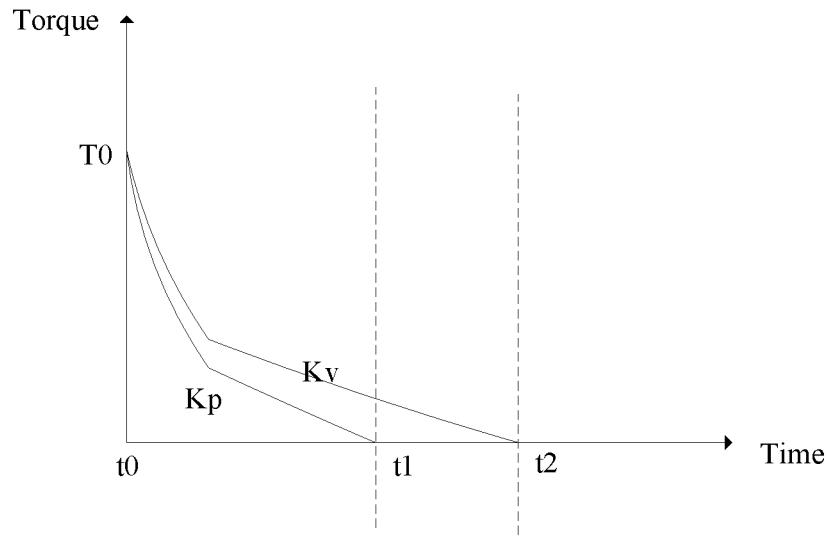
FIG. 5C is a schematic diagram showing another control curve of the motor torque according to some embodiments of the present disclosure.

As shown in FIGS. 5A, 5B, and 5C, Kp gradually decreases faster than Kv. In some embodiments, Kp is controlled to decrease gradually to zero according to the sensitivity value parameter from the moment when the gimbal is powered off or sleeps. Meanwhile, Kv is controlled to decrease gradually to zero according to the force value parameter from the moment when the gimbal is powered off or sleeps. In some other embodiments, at t0, the gimbal is powered off or sleeps, then, Kp decreases gradually to zero in time t0-t1, and Kv decreases gradually to zero in time t0-t2, where, t1 is earlier than t2.

Further, Kp may decrease in any of the following manners.

In some embodiments, Kp may be controlled to decrease linearly from the moment when the gimbal is powered off or sleeps according to the sensitivity value parameter. As shown in FIG. 5A, Kp decreases at a constant speed, which may result in great user experience.

In some embodiments, Kp may be controlled to decrease non-linearly from the moment when the gimbal is powered off or sleeps according to the sensitivity value parameter, and a tangent slope of a curve of the nonlinear decrease of Kp may decrease gradually. In some embodiments, as shown in FIG. 5B, the speed of the gradual decrease of the tangent slope decreases gradually. As such, an amplitude of decreasing of the torque of the electric motor changes from large to small. That is, when the electric motor starts to release the force, the torque decreases quickly, and when the camera device is close to the axis arm or ground, the torque decreases slowly (compared to the decrease speed of the torque when the electric motor starts to release the force) to cause the gimbal to be powered off or sleep faster.

In some embodiments, Kp may be controlled to decrease non-linearly first and then linearly according to the sensitivity value parameter from the moment when the gimbal is powered off or sleeps. As shown in FIG. 5C, the slope of the linear decrease is smaller than the tangent slope of the Kp curve of the non-linear decrease. In some embodiments, Kp may be controlled to decrease linearly with a first slope first and then with a second slope. The first slope is greater than the second slope. As such, the amplitude of decreasing of the torque of the electric motor may change from large to small. That is, when the electric motor starts to release the force, the torque decreases quickly, and when the camera device is close to the axis arm or ground, the torque decreases slowly (compared to the decrease speed of the torque when the electric motor starts to release the force) to cause the gimbal to be powered off or sleep faster.

Kv may decrease in any of the following manners.

In some embodiments, Kv may be controlled to decrease linearly from the moment when the gimbal is powered off or sleeps according to the force value parameter. As shown in FIG. 5A, Kv decreases at a constant speed, which may result in great user experience.

In some embodiments Kv may be controlled to decrease non-linearly from the moment when the gimbal is powered off or sleeps according to the force value parameter, and a tangent slope of a curve of the nonlinear decrease of Kp may decrease gradually. In some embodiments, as shown in FIG. 5B, the speed of the gradual decrease of the tangent slope decreases gradually. As such, an amplitude of decreasing of the torque of the electric motor changes from large to small. That is, when the electric motor starts to release the force, the torque decreases quickly, and when the camera device is close to the axis arm or ground, the torque decreases slowly (compared to the decrease speed of the torque when the electric motor starts to release the force) to cause the gimbal to be powered off or sleep faster.

In some embodiments, Kv may be controlled to decrease non-linearly first and then linearly according to the force value parameter from the moment when the gimbal is powered off or sleeps. As shown in FIG. 5C, the slope of the linear decrease is smaller than the tangent slope of the Kv curve of the non-linear decrease. In some embodiments, Kv may be controlled to decrease linearly with a third slope first and then with a fourth slope. The third slope is greater than the fourth slope. As such, the amplitude of decreasing of the torque of the electric motor may change from large to small. That is, when the electric motor starts to release the force, the torque decreases quickly, and when the camera device is close to the axis arm or ground, the torque decreases slowly (compared to the decrease speed of the torque when the electric motor starts to release the force) to cause the gimbal to be powered off or sleep faster.

The manners of decreasing Kp and Kv may be determined by selecting a combination of any of above manners as needed.

Further, the speed of the gradual decrease of Kp may be positively correlated with the mass of the camera device, and the speed of the gradual decrease of Kv may also be positively correlated with the mass of the camera device. That is, the greater the mass of the camera device is, the faster the speed of the gradual decrease of Kp and the speed of the gradual decrease of Kv are. As such, the impact to the camera device caused by falling when the gimbal is powered off or sleeps can be reduced.

In some embodiments, both Kp and Kv may decrease linearly. Both the speed of the linear decrease of Kp and the speed of the linear decrease of Kv may be positively correlated to the mass of the camera device.

In some embodiments, the gimbal may automatically configure the control parameters of the electric motor 120 used when the gimbal is powered off or sleeps according to the mass of the camera device carried by the gimbal. Thus, the electric motor 120 may not be powered off instantly when the gimbal is powered off or sleeps. As such, when the gimbal is not adjusted to the balanced state, the camera device may not be damaged or bumped when the electric motor 120 releases the force, which may effectively protect the camera device and improve the user experience.

The control system of the gimbal may provide stabilization control to photographing of the camera device. Therefore, after the camera device is mounted to the gimbal, the gimbal may need to configure the parameters (excluding the control parameters of the electric motor 120 used when the gimbal is powered off or sleeps in the above embodiments) of the control system to satisfy the photographing requirements in different situations. In some embodiments, the user of the gimbal may configure the parameters manually, which may require the user of the gimbal to have a strong parameter adjustment experience and perform the parameter adjustment back and forth to complete the configuration to cause the gimbal to satisfy the photographing requirements during operation. In addition, when the gimbal carries different camera devices, an inherent mode of the gimbal may change. Therefore, the gimbal may need to be corrected manually, such that the gimbal may operate normally. In this case, before the gimbal operates when carrying the different camera devices, the gimbal parameter configuration process may be cumbersome, and the accuracy of the configuration may not be high. Therefore, in some embodiments, the gimbal may self-adaptively adjust the parameter configuration of the gimbal (e.g., setting filter parameters, leading compensation, lag compensation, etc.) to satisfy the photographing requirements of the gimbal operation, and meanwhile save the operation for the user of the gimbal adjusting the parameters back and forth and improve the efficiency and accuracy of the parameter configuration.

Figure 6:
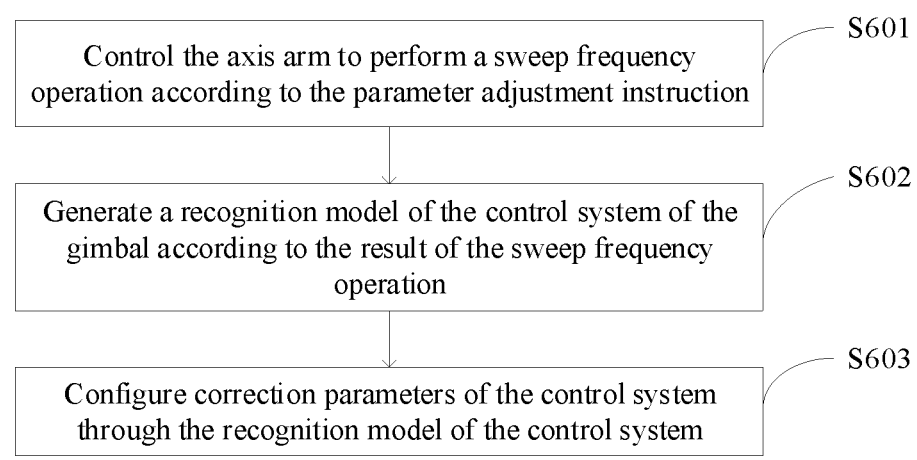
FIG. 6 is a schematic flowchart of a gimbal control method according to some other embodiments of the present disclosure.

In some embodiments, as shown in FIG. 6, after the parameter adjustment instruction is received, the gimbal control method further includes the following processes.

At S601, the axis arm 110 is controlled to perform a sweep frequency operation according to the parameter adjustment instruction.

Sweep frequency refers to a process that a frequency of a signal continuously changes from high to low or from low to high in a frequency band. The sweep frequency operation may test a frequency feature of a sweep frequency object. In some embodiments, for example, after the gimbal receives the parameter adjustment instruction, the three axis arms 110 of the gimbal may be triggered to enter an automatic sweep frequency mode to test the frequency feature of the gimbal.

In some embodiments, after the gimbal receives the parameter adjustment instruction, the axis arm 110 may be triggered to enter the automatic sweep frequency mode. In the automatic sweep frequency mode, a continuous sweep frequency signal may be generated in a predetermined frequency range, for example, a continuous sine sweep signal may be generated in a range of 30 Hz to 300 Hz.

At S602, a recognition model of the control system of the gimbal is generated according to the result of the sweep frequency operation.

In some embodiments, after the gimbal obtains a frequency response information of the continuous sweep frequency signal under the sweep frequency operation, the gimbal may generate a Bode plot of the gimbal control system according to the frequency response information. The gimbal may further use the Bode plot as the recognition model of the control system. The Bode plot includes a phase angle diagram used to represent the relationship between the frequency and phase and an amplitude diagram used to represent the relationship between the frequency and amplitude.

In some embodiments, when the roll axis arm, the pitch axis arm, and the yaw axis arm of the three-axis gimbal all enter the automatic sweep frequency mode, the continuous sweep frequency signal may be generated in the frequency range of 30 Hz to 300 Hz. The frequency response information of the continuous sweep signal may include phase response information and amplitude response information.

Further, the recognition model of the gimbal control system may be generated according to the obtained phase response information and the amplitude response information. The recognition model may be demonstrated through the Bode plot. The Bode plot is a diagram demonstration method for the system frequency response and is composed of the amplitude diagram representing the relationship between the frequency and the amplitude and the phase angle diagram representing the relationship between frequency and the phase. Both the amplitude diagram and the angle phase diagram are plotted on the logarithmic scale of the frequency. Therefore, the Bode plot is referred to as a logarithmic graph. The size and phase of the system gain may be analyzed under different frequencies by using the Bode plot. A trend of the size and phase of the system gain changing with the frequency may be analyzed to determine the stability of the system.

In some embodiments, the Bode plot may be plotted according to the frequency response information by software installed at the gimbal. In some other embodiments, by outputting the frequency response information to a specific terminal, the Bode plot may be plotted by a software (e.g., MATLAB) installed at the terminal. Embodiments of the present disclosure do not limit how the Bode plot is plotted.

At S603, correction parameters of the control system are configured through the recognition model of the control system.

When the correction parameters are configured, an eigenfrequency may be obtained by analyzing the Bode plot of process S602, and then, filter parameters of the control system may be set according to the eigenfrequency to cause the gimbal to filter out the signal having the eigenfrequency during the operation.

The eigenfrequency may also be referred to as a modal frequency or a natural frequency, which means that when an object vibrates freely, the displacement changes with time according to the sine or cosine law. The frequency of the vibration is only related to inherent characteristics of the object (such as mass, shape, material, etc.).

Since the natural frequency of the gimbal may cause resonance to affect the normal operation of the gimbal. Therefore, when configuring the parameters of the gimbal, after obtaining the natural frequency of the gimbal, the gimbal may need to perform a correction operation to avoid the natural frequency affecting the normal operation of the gimbal.

When the correction operation is performed, the filter parameters of the filter 1 and filter 2 as shown in FIG. 3 may be set according to the natural frequency. As such, the gimbal may filter out the signal having the natural frequency during operation to ensure that the gimbal may operate normally.

In some embodiments, the gimbal may self-adaptively adjust the gimbal parameter configuration to satisfy the photographing requirements of the operation of the gimbal, and at the same time, save the operation of the user of the gimbal adjusting the parameters back and forth and improve the efficiency and accuracy of the parameter configuration.

Corresponding to the gimbal control method embodiments, the present disclosure further provides gimbal control device embodiments.

FIG. 7 is a schematic block diagram of the control device of the gimbal consistent with the disclosure. The device includes the axis arm 110, the electric motor 120 connected to the axis arm 110, and the controller 130. The controller 130 is communicatively connected to the electric motor 120. The electric motor 120 is configured to drive the corresponding axis arm 110 to rotate to drive the camera device to move in one or more directions.

The control device may include one or more controllers 130, which may operate individually or collectively.

The controller 130 may be configured to, when the gimbal is powered on, configure the control parameters of the electric motor 120 used when the gimbal is powered off or sleeps according to the mass of the camera device carried by the gimbal. The controller 130 may be further configured to control the torque of the electric motor 120 to, when the gimbal is powered off or sleeps, decrease gradually according to the control parameters from the moment when the gimbal is powered off or sleeps.

In some embodiments, the controller 130 may be configured to control the torque of the electric motor 120 to decrease gradually to zero from the moment when the gimbal is powered off or sleeps according to the control parameters.

In some embodiments, the controller 130 may be configured to, according to the mass of the camera device, configure the sensitivity value parameter of the position feedback control loop and the force value parameter of the speed feedback control loop of the electric motor 120.

In some embodiments, the controller 130 may be configured to control the gain of the position feedback control loop of the electric motor 120 to decrease gradually according to the sensitivity value parameter from the moment when the gimbal is powered off or sleeps, and meanwhile, and control the gain of the speed feedback control loop of the electric motor 120 to decrease gradually according to the force value parameter from the moment when the gimbal is powered off or sleeps. The gain of the position feedback control loop of the electric motor 120 gradually decreases faster than the gain of the speed feedback control loop of the electric motor 120.

In some embodiments, the controller 130 may be configured to control the gain of the position feedback control loop of the electric motor 120 to decrease gradually to zero according to the sensitivity value parameter from the moment when the gimbal is powered off or sleeps. Meanwhile, the controller 130 may be configured to control the gain of the speed feedback control loop of the electric motor 120 to decrease gradually to zero according to the force value parameter from the moment when the gimbal is powered off or sleeps.

In some embodiments, the controller 130 may be configured to control the gain of the position feedback control loop of the electric motor 120 to decrease linearly according to the sensitivity value parameter from the moment when the gimbal is powered off or sleeps.

In some embodiments, the linear decrease speed of the gain of the position feedback control loop of the electric motor 120 is positively correlated with the mass of the camera device.

In some embodiments, the controller 130 may be configured to control the gain of the speed feedback control loop of the electric motor 120 to decrease linearly according to the force value parameter from the moment when the gimbal is powered off or sleeps.

In some embodiments, the linear decrease speed of the gain of the speed feedback control loop of the electric motor 120 is positively correlated with the mass of the camera device.

In some embodiments, the controller 130 may be configured to calculate the moment of inertia of the camera device according to the mass of the camera device and configure the control parameters of the electric motor 120 used when the gimbal is powered off or sleeps according to the moment of inertia.

In some embodiments, as shown in FIG. 8, the gimbal control device further includes an IMU 150. The IMU 150 is arranged at the axis arm 110 and electrically connected to the controller 130. According to the mass of the camera device, the controller 130 may calculate the moment of inertia of the camera device, which may be performed by the following calculation manner. The torque of the axis arm 110 may be obtained according to the current of the electric motor 120. The angular acceleration of the axis arm 110 may be measured by the IMU 150. Then, the moment of inertia of the camera device may be obtained by calculating the ratio of the torque of the axis arm 110 to the angular acceleration value of the axis arm 110.

In some embodiments, the controller 130 may be configured to, according to the mass of the camera device and the predetermined parameter configuration model, configure the control parameters of the electric motor 120 used when the gimbal is powered off or sleeps.

In some embodiments, after configuring the control parameters of the electric motor 120 used when the gimbal is powered off or sleeps according to the mass of the camera device at the gimbal, the controller 130 may be further configured to, according to the real-time focal length of the camera device, self-adaptively adjust the control parameters of the electric motor 120 used when the gimbal is powered off or sleeps.

In some embodiments, after configuring the control parameters of the electric motor 120 used when the gimbal is powered off or sleeps according to the mass of the camera device carried by the gimbal, the controller 130 may be further configured to store the control parameters of the electric motor 120 used when the gimbal is powered off or sleeps.

In some embodiments, the electric motor 120 may include the yaw axis electric motor, the roll axis electric motor, and the pitch axis electric motor. The control parameters may include the control parameters corresponding to the above three electric motors.

In some embodiments, before configuring the control parameters of the electric motor 120 used when the gimbal is powered off or sleeps according to the mass of the camera device at the gimbal, the controller 130 may be further configured to receive the parameter adjustment instruction.

In some embodiments, the controller 130 may receive the parameter adjustment instruction through any one of the following manners. When the gimbal is in the power on mode, the gimbal may receive the parameter adjustment instruction obtained by triggering the parameter adjustment button at the gimbal. When the gimbal is in the power on mode, the gimbal may receive the parameter adjustment instruction, which may be sent by the remote controller corresponding to the gimbal.

In some embodiments, referring again to FIG. 8, the gimbal includes a fixing mechanism 140. The fixing mechanism 140 may be configured to fix the camera device carried by the gimbal.

As such, the gimbal controller 130 may, according to the mass of the camera device carried by the gimbal, self-adaptively configure the control parameters of the electric motor 120 used when the gimbal is powered off or sleeps, such that the electric motor 120 may not be powered off instantly when the gimbal is powered off or sleeps. Therefore, when the gimbal is not adjusted to the balanced state, the camera device may not be damaged or bumped when the electric motor 120 release the force, which can effectively protect the camera device and improve the user experience.

Those of ordinary skill in the art may understand that all or a part of processes consistent with embodiments of the present disclosure may be implemented by the computer program instructing the related hardware. The program may be stored in a computer-readable storage medium, when the program is executed, the processes consistent with embodiments of the present disclosure may be implemented. The storage medium may include a magnetic disk, an optical disc, a read-only memory (ROM), or a random-access memory (RAM), etc.

Only some embodiments of the present disclosure are disclosed above, which should not be used to limit the scope of the present disclosure. Therefore, equivalent changes made according to the claims of the present invention are still within the scope of the present invention.

What is claimed is:

1. A gimbal control method comprising:
    configuring, while a gimbal is in a power-on state, turning-off motor control parameters according to a mass of a camera device carried by the gimbal, the gimbal including an electric motor, and the turning-off motor control parameters being configured to control the electric motor when the gimbal is powered off or enters a sleep state; and
    in response to the gimbal being powered off or entering the sleep state, controlling a torque of the electric motor to decrease gradually from a starting moment at which the gimbal is powered off or enters the sleep state according to the turning-off motor control parameters.

2. The method of claim 1, wherein controlling the torque of the electric motor to decrease gradually from the starting moment according to the turning-off motor control parameters includes:
    according to the turning-off motor control parameters, controlling the torque of the electric motor to decrease gradually to zero from the starting moment.

3. The method of claim 1, wherein configuring the turning-off motor control parameters according to the mass of the camera device includes:
    according to the mass of the camera device, configuring a sensitivity value parameter of a position feedback control loop of the electric motor and a force value parameter of a speed feedback control loop of the electric motor.

4. The method of claim 3, wherein controlling the torque of the electric motor to decrease gradually from the starting moment includes:
    controlling a gain of the position feedback control loop and a gain of the speed feedback control loop to decrease gradually from the starting moment according to the sensitivity value parameter and the force value parameter, respectively, a decrease speed of the gain of the position feedback control loop being greater than a decrease speed of the gain of the speed feedback control loop.

5. The method of claim 4, wherein controlling the gain of the position feedback control loop and the gain of the speed feedback control loop to decrease gradually from the starting moment according to the sensitivity value parameter and the force value parameter, respectively, includes:
    controlling the gain of the position feedback control loop and the gain of the speed feedback control loop to decrease gradually to zero from the starting moment according to the sensitivity value parameter and the force value parameter, respectively.

6. The method of claim 4, wherein, controlling the gain of the position feedback control loop to decrease gradually from the starting moment according to the sensitivity value parameter includes:
    according to the sensitivity value parameter, controlling the gain of the position feedback control loop to decrease linearly from the starting moment.

7. The method of claim 6, wherein a linear decrease speed of the gain of the position feedback control loop is positively correlated to the mass of the camera device.

8. The method of claim 4, wherein controlling the gain of the speed feedback control loop to decrease gradually from the starting moment according to the force value parameter includes:
    according to the force value parameter, controlling the gain of the speed feedback control loop to decrease linearly from starting the moment.

9. The method of claim 8, wherein a linear decrease speed of the gain of the speed feedback control loop is positively correlated to the mass of the camera device.

10. The method of claim 1, wherein configuring the turning-off motor control parameters according to the mass of the camera device includes:

calculating a moment of inertia of the camera device according to the mass of the camera device; and configuring the turning-off motor control parameters according to the moment of inertia.

11. The method of claim 1, wherein configuring the turning-off motor control parameters according to the mass of the camera device includes:

according to the mass of the camera device and a predetermined parameter configuration model, configuring the turning off control parameters of the electric motor.

12. The method of claim 1, further comprising, after configuring the turning-off motor control parameters according to the mass of the camera device:

according to a real-time focal length of the camera device, self-adaptively adjusting the turning-off motor control parameters.

13. The method of claim 1, further comprising, after configuring the turning-off motor control parameters according to the mass of the camera device at the gimbal:

storing the turning-off motor control parameters.

14. The method of claim 1, wherein:

the electric motor is one of a yaw axis motor, a roll axis motor, and a pitch axis motor of the gimbal; and the turning-off motor control parameters are configured to control the yaw axis motor, the roll axis motor, and the pitch axis motor when the gimbal is powered off or enters the sleep state.

15. The method of claim 1, further comprising, before configuring the turning-off motor control parameters according to the mass of the camera device at the gimbal:

receiving a parameter adjustment instruction.

16. The method of claim 15, wherein receiving the parameter adjustment instruction includes:

while the gimbal is in the power-on state, receiving the parameter adjustment instruction obtained by triggering a parameter adjustment button at the gimbal; or while the gimbal is in the power-on state, receiving the parameter adjustment instruction sent by a remote controller corresponding to the gimbal.

17. A gimbal control method comprising:

configuring, while a gimbal is in a power-on state, turning-off motor control parameters, the gimbal including an axis arm and an electric motor configured to drive the axis arm to rotate to drive a camera device carried by the gimbal to move in one or more directions, the turning-off motor control parameters being configured to control the electric motor when the gimbal is powered off or enters a sleep state, and configuring the turning-off motor control parameters including:

obtaining a torque of the axis arm according to a current value of the electric motor;

measuring an angular acceleration of the axis arm through an inertial measurement unit (IMU) arranged at the axis arm;

calculating a ratio of the torque of the axis arm to the angular acceleration to obtain a moment of inertia of the camera device; and configuring the turning-off motor control parameters according to the moment of inertia of the camera device; and in response to the gimbal being powered off or entering the sleep state, controlling a torque of the electric motor to decrease gradually from a starting moment at which the gimbal is powered off or enters the sleep state according to the turning-off motor control parameters.

18. A gimbal control device comprising:

an axis arm;

an electric motor connected to the axis arm and configured to drive the axis arm to drive a camera device carried by the gimbal to move in one or more directions; and one or more controllers communicatively connected to the electric motor and configured to operate individually or collectively to:

configure, while the gimbal is in a power-on state, turning-off motor control parameters according to a mass of the camera device, the turning-off motor control parameters being configured to control the electric motor when the gimbal is powered off or enters a sleep state; and in response to the gimbal being powered off or entering the sleep state, control a torque of the electric motor to decrease gradually from a starting moment at which the gimbal is powered off or enters the sleep state according to the turning-off motor control parameters.

19. The device of claim 18, wherein the one or more controllers are further configured to:

according to the turning-off motor control parameters, control the torque of the electric motor to decrease gradually to zero from the starting moment.

20. The device of claim 18, wherein the one or more controllers are further configured to:

according to the mass of the camera device, configure a sensitivity value parameter of a position feedback control loop of the electric motor and a force value parameter of a speed feedback control loop of the electric motor.

* * * * *